United States Patent [19]

Manaresi et al.

[11] Patent Number: 4,789,723

[45] Date of Patent: Dec. 6, 1988

[54] POLYCARBONATE BRANCHED WITH DOUBLE-RING AROMATIC COMPOUND

[75] Inventors: Piero Manaresi; Francesco Pilati, both of Bologna; Corrado Berti, Lugo; Alberto Petri, Milan, all of Italy

[73] Assignee: Enichem Tecnoresine S.p.A., Palermo, Italy

[21] Appl. No.: 943,549

[22] Filed: Dec. 17, 1986

[30] Foreign Application Priority Data

Dec. 19, 1985 [IT] Italy ............................... 23285 A/85

[51] Int. Cl.⁴ ............................................. C08G 63/62
[52] U.S. Cl. ..................... 528/175; 528/176; 528/190; 528/194; 528/201; 528/202
[58] Field of Search ............... 528/175, 174, 176, 190, 528/194, 201, 202

[56] References Cited

U.S. PATENT DOCUMENTS 4,188,475   2/1980   Margotte .............................. 528/175

Primary Examiner—Harold D. Anderson
Attorney, Agent, or Firm—Hedman, Gibson, Costigan & Hoare

[57] ABSTRACT

In the present invention disclosed are high-molecular-weight, soluble, thermoplastic branched polycarbonates endowed with improved properties, and suitable to blow-moulding fabrication.

Such polycarbonates are characterized by the presence, in their structure, of units deriving from the following double-ring aromatic compounds:

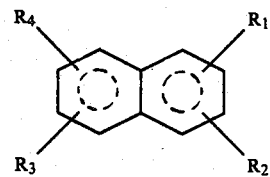

wherein $R_1$ indicates H, —COCL, —SO$_2$Cl; $R_2$, $R_3$ and $R_4$, equal to or different from each other, indicate —COCl or SO$_2$Cl.

The above-said compounds are directly used in the syntheses.

2 Claims, No Drawings

POLYCARBONATE BRANCHED WITH DOUBLE-RING AROMATIC COMPOUND

The polycarbonates are thermoplastic materials which are largely used in several application sectors. They are normally prepared by the reaction of a precursor of the carbonate group with a bifunctional phenol, and have a linear structure.

To the contrary of the most thermoplastic polymers, linear polycarbonate (PC) has an exclusively Newtonian behaviour, at least for not excessively high values of shear rate, and, anyway, its deviations from such a behaviour, at high $\dot{\gamma}$, are not so large as in case of other products.

The newtonian behaviour is attained, as known, when $\eta$ (apparent viscosity) is substantially independent from $\dot{\gamma}$ (shear rate).

This rheological behaviour can represent a disadvantage when flexibility is required to the product, for it to be fabricated according to different technologies.

Usually, linear PC is fabricated by injection-moulding, whilst a high-quality product cannot be practically obtained by extrusion or blow-moulding, which are the techniques suitable to supply particular fabricated products (cellular sheets, bottles, hollow containers, and so on).

In the above said techniques, it is in fact necessary that the fluid has an apparent viscosity decreasing with increasing shear rate, typical characteristic of the non-Newtonian behaviour, so to make it possible to differentiate the state of the molten polymer at two different times: at a first time, when it is inside the fabrication machine (e.g., an extruder), and at a second time, when the product exits this latter (e.g., from the die of the same extruder).

In the first step the shear rates the fluid undergoes are high, and vice-versa, its apparent viscosity is low, so that the fabricability thereof results easier; when it leaves the extruder, to the contrary, low values of $\dot{\gamma}$ and high viscosities prevail, and this prevents the product from collapsing, and allows a good dimensional stability of the fabricated product to be achieved.

The non-Newtonian behaviour of the molten polymer has a considerable influence on two properties, the melt elasticity—or pseudo-elasticity—and the melt strength which are very important as well to the purposes of the extrusion and blow-moulding fabrication techniques.

The melt elasticity consists essentially in the ability of the non-Newtonian fluid to swell to a greater extent, when leaving the die, than a Newtonian fluid, as a consequence of a greater recovery of elastic energy in its interior, thanks to a greater distortion and molecular orientation under the action of a shear force.

This results in an increase in the product fabricability, thanks to a higher flexibility and ductility of the material.

The second indicated property, the melt tenacity, becomes meaningful, vice-versa, at the time of the melt exiting from the fabrication machine. It can be considered as the tenacity of the polymer in the molten state, i.e., the capability, shown by this latter, to withstand the stress. If, in fact, the molten mass is not able to support its own weight, the collapse results of the extrudate and, as a consequence, obtaining the desired shapes in the manufactured item is not possible.

From the above, it results evident that the polymers having a non-Newtonian behaviour show two basic characteristics, which allow them to be fabricated by extrusion and/or blow-moulding: great easeness of processing inside the fabrication machine (low apparent viscosity for high $\dot{\gamma}$ and high pseudo-elasticity) and very good resistance to collapse on exiting the same (high apparent viscosity for low $\dot{\gamma}$ and considerable melt tenacity).

Polycarbonates having non-Newtonian rheological properties can be easily prepared by using polyfunctional comonomers containing three or more reactive groups, so to obtain a structure characterized by the presence of branchings of statistical type.

For example, in U.S. Pat. No. 2,950,266, the synthesis is disclosed of products of the type, carried out by using phloroglucinol as the polyfunctional comonomer.

We have found now that it is possible to prepare branched polycarbonates, endowed with excellent rheological properties, such as to allow them to be fabricated by blow-moulding processes, by using, as the branching agents, double-ring aromatic compounds, having the hereunder reported formula which, although have a reactivity at all comparable to that of the aromatic di-hydroxy-derivatives, allow the branched polycarbonates to be obtained, even if they are used in amounts rather small and, however, considerably lower than those necessary, e.g., in case of phloroglucin.

A first object of the present invention is therefore constituted by branched polycarbonates containing, in their structure, units deriving from double-ring aromatic compounds, having the following general formula (I):

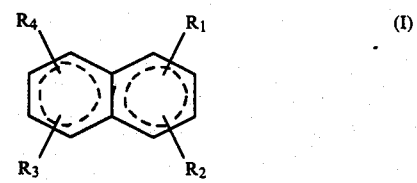

wherein $R_1$ indicates H, —COCl, —SO$_2$Cl, and $R_2$, $R_3$, $R_4$, equal to, or different from each other, indicate COCl or —SO$_2$Cl.

A second object of the present invention is in its turn a method for the production of branched, soluble, high-molecular-weight polycarbonates, particularly suitable to be fabricated by blow-moulding techniques.

Such a method consists in the condensation between possibly halogenated aromatic di-hydroxy-derivatives, or their mixtures, and phosgene, or precursors of the carbonate group, or polycarbonate oligomers containing chloroformyl groups, by means of interface reaction, or in solution, at temperatures comprised within the range of from 15° to 80° C., in the presence of a monovalent aromatic hydroxy-compound; or, by trans-esterification between the same aromatic dihydroxy-derivatives and alkyl, aryl, or alkyl-aryl diesters of carbonic acid in the molten state, at temperatures comprised within the range of from 100° to 300° C., all of the above said routes being characterized in that they are performed in the presence of at least a compound having the above reported formula (I), in an amount ranging from 0.05 to 5 mol % relatively to the aromatic di-hydroxy-derivative.

The above indicated double-ring aromatic derivatives can be prepared by the chlorination of the corresponding carboxy and/or sulphonic acids according to known processes, typical of the organic chemistry.

Example of double-ring aromatic compounds are:
1,3,6-trichlorocarbonyl-naphthalene ($R_1=H$, $R_2=R_3=R_4=-COCl$);
3,6-dicarboxy-α-naphthalene-sulfonic acid trichloride ($R_1=H$, $R_2=-SO_2Cl$, $R_3=R_4=-COCl$);
3,6-disulpho-α-naphthoic acid trichloride ($R_1=H$, $R_2=R_3=-SO_2Cl$, $R_4=-COCl$);
1,3,6-naphthalenetrisulphonic acid trichloride ($R_1=H$, $R_2=R_3=R_4=SO_2Cl$);
1,4,5,8-naphthalene-tetracarboxy acid tetrachloride ($R_1=R_2=R_3=R_4=-COCl$);
4,8-disulpho-2,6-dicarboxy acid tetrachloride ($R_1=R_3=-COCl$; $R_2=R_4=SO_2Cl$).

The aromatic dihydroxy-compounds which can find use in the practical embodiment of the present invention are represented by the following formula:

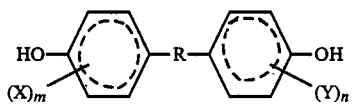

wherein R is a substituted or non-substituted alkyl group containing from 0 to 5 carbon atoms, —O—, —S—, —SO₂—, —CO—; X and Y are equal to or different from each other and equivalent to H, CH₃ or halogens; m and n are integers, equal to or different from each other, ranging from 1 to 4.

Typical examples of such compounds are:
4,4'-dihydroxy-diphenyl;
2,2-bis(4-hydroxyphenyl)propane (bisphenol A);
bis(4-hydroxyphenyl)-methane;
2,2-bis(3,5-dichloro-4-hydroxyphenyl)propane;
2,2-bis(3,5-dimethyl-4-hydroxyphenyl)propane; etc.

Also bivalent aromatic single-ring compounds can be used as well, such as resorcinol, hydroquinone and pyrocatechol, as well as mixtures of all of the mentioned compounds.

To the purpose of regulating the molecular weight of the resulting polycarbonate, mono-hydroxy compounds are suitable, such as, e.g., phenol-p-isopropylphenol, p-tert.butylphenol, etc.

The branched polycarbonates of the present invention can be prepared according to one of the polycondensation methods as reported in the prior art.

For example, the di-hydroxyaryl-derivative is dissolved in an aqueous solution of sodium hydroxide, and to such a solution an organic solvent immiscible with water is added, such as, e.g, dichloromethane, containing the polyfunctional comonomer (branching agent).

In the presence of a molecular weight regulator, e.g., a monofunctional phenol, and of a phase transfer catalyst, e.g., a tertiary amine, through the mixture phosgene gas is bubbled, and the reaction is controlled at a temperature comprised within the range of from 15° to 25° C. for a time ranging from 20 minutes to 6 hours.

The so-obtained branched polycarbonate is isolated, with high yields, after washing the organic phase by known techniques, and distilling off the solvent, or precipitation by a non-solvent.

A variant of this method consists in first preparing chloroformyl-terminated polycarbonate oligomers by the interface reaction between phosgene and the dihydroxyaryl compounds dissolved in aqueous-alkaline solution, in the presence of an organic solvent. The average molecular weight of the oligomers, preferably comprised within the range of from 400 to 2000, can be determined a priori by means of the use of monofunctional phenols.

After the separation of the two phases, the organic solution containing the chloroformyl-terminated oligomers is submitted to interface polycondensation of the presence of the branching agent. The branched polycarbonate so obtained is purified according to as indicated in the above reported technology.

It is suitable to introduce in the aqueous phase reducing agents, such as, e.g., sodium hyposulphite, to prevent the formation of coloured byproducts.

Another possibility for obtaining the branched polycarbonates consists in the known methodology of polycondensation in solution: in this case, phosgene is bubbled through a solution of methylene chloride and pyridine containing the molecular weight regulator (monofunctional phenol), the dihydroxyaryl derivative and the polyfunctional compound, as the branching agent, which is the object of the present invention. The so-obtained polycarbonate is then directly isolated, with high yields, by distilling off the solvent, or by precipitation with a non-solvent.

The mixture of diphenolic and polyfunctional compounds (branching agents) can be transformed into a high-molecular-weight polycarbonate also by the method of the transesterification in the molten state, by means of the reaction with dialkyl, diaryl or alkylaryl carbonates, at temperatures comprised within the range of from 100° to 300° C., and in the presence of such transesterification catalysts as the alkali metals and their oxides, transition metal alkoxides, or the like.

In this case, the polymerizzation degree is controlled not by the presence of molecular weight regulators, but by the efficiency of the byproducts removal and by the stirring of the molten mass.

The high-molecular-weight branched polycarbonates obtained, according to the spirit of the present invention, by any of the described methods, are characterized by the complete solubility in the usual solvents of the linear polymer, and by a high dependence of the melt viscosity on the shear rate.

In fact, the shear sensitivity, which is the ratio between the melt flow rates at two different values of the shear stress and, hence, an indirect measurement of the non-Newtonian behaviour of the polymer, has values always higher than 15, while the linear polycarbonate has values around 12–13.

The polycarbonates prepared according to the present invention are suitable for being both fabricated by extrusion and by injection moulding.

Furthermore, because of the excellent dimensional stability of the molten mass, they can be fabricated also by the blow-moulding method for the production of hollow bodies.

Finally, due to their rheological characteristics, it is possible to easilty obtain extruded sheets having good mechanical properties and endowed with higher resistance to stresses.

For the characterization of the branched polycarbonates prepared according to the present invention, the following procedures have been used:

Intrinsic viscosity. It is determined in methylene chloride at 20° C. by means of the Ubbelhode viscometer and is expressed as dl/g.

Shear sensitivity. The evaluation is carried out on melt indexer, with loads of 2.16 and 21.6 kg at 260° C., according to ASTM D 1238 Standard;

Impact resistance (IZOD). It is measured on specimens with notch at 0° C. according to ASTM D 256 Standard.

EXAMPLE 1

Preparation of 1,3,6-naphthalenetrisulphonic acid trichloride

In a 50-ml flask 0.87 g (2 mmol) of the monosodium salt of 1,3,6-naphthalene-trisulphonic acid, 1.24 g (6 mmol) of phosphorus pentachloride and 20 ml of thionyl chloride are placed: the mixture is refluxed, with stirring, for 10 hours, after the beginning of the reaction an excess of $PCl_5$ (0.83 g, equal to 4 mmol) being added. The reaction kinetics can be monitored, by I.R. spectroscopy, by observing the disappearance of the wide absorption band at $\overline{v}=1160-1210$ cm$^{-1}$ and the contemporaneous appearing of a narrower band at $\overline{v}=1170$ cm$^{-1}$.

After the reaction end, the thionyl chloride is removed by distillation under room pressure (boiling point=79° C.), and the product is recovered, after being preliminarily dissolved in methylene chloride, by crystallization with a methylene chloride/n-hexane mixture.

Such a product is a white solid. The yield is of about 80%.

Melting point=194°–196° C.

Elemental analysis: S=22.4, Cl=25.3%. (Theoretical for $C_{10}H_5O_6S_3Cl_3$: S=22.6, Cl=25.1%).

The values of equivalent weight (titration of chlorides) and molecular weight are in accordance with the proposed formula.

The other double-ring aromatic derivatives of general formula (1) are prepared by modalities analogous to as above described.

EXAMPLE 2

To a 3-l glass reactor, at the controlled temperature of 25° C., there are charged, under nitrogen, 84 g of bisphenol A, 390 mg of 1,3,6-naphthalenetrisulphonic acid trichloride (branching agent, equivalent to 0.25% molar relatively to bisphenol), 65.2 g of sodium hydroxide dissolved in 650 ml of water, 20 mg of sodium hyposulphite (as the reducing agent) and 6.3 ml of 0.5N aqueous solution of triethylamine.

To them added is then 2.7 g of p-tert.butylphenol dissolved in 1300 ml of methylene chloride and into the mixture, kept vigorously stirred, 44 g of phosgene gas is bubbled over 30 minutes.

The reaction is continued for 2 hours, with aqueous sodium hydroxide (20% by weight) being added, to the purpose of maintaining a pH value higher than 11.

The reaction mixture is finally diluted with 500 ml of methylene chloride, and the organic phase is separated and subsequently washed with 300 ml of water (twice), 800 ml of 0.15N aqueous sodium hydroxide (three times), 600 ml of water (twice), 800 ml of 0.1N hydrochloric acid and, finally, with 600-ml portions of water, up to neutrality.

At the end, the polymer is recovered by distilling off the organic polymer, is dried and ground up to obtain a powder.

The branched polycarbonate shows the following characteristics:
intrinsic viscosity=0.552 dl/g;
shear sensitivity=21.8;
IZOD impact strength=820 J/m.

EXAMPLE 3

212 g of chloroformyl-terminated polycarbonate oligomers (number average molecular weight=623, chloroformyl end groups=2594 meq/kg, hydroxy end groups=617 meq/kg), prepared from bisphenol A, phosgene and p-tert-butyl-phenol and dissolved in 900 ml of methylene chloride, is charged, under nitrogen, to a 2.5-l glass reactor kept at the controlled temperature of 25° C.

While a mechanical stirring is maintained by means of an anchor device (300 rpm), to it added are, in the order as mentioned: 50 ml of water containing 1.45 g of 1,3,6-naphthalenetrisulphonic acid trichloride (branching agent, equivalent to 0.35% molar relatively to total bisphenol A), 6.0 g of sodium hydroxide, 31 mg of sodium hyposulphite and 5 ml of 0.05N aqueous solution of triethylamine.

Thereafter, to the vessel charged are 97 ml of a 20% (by weight) sodium hydroxide solution, over 10 minutes, by using a metering pump, and, 30 minutes later, 300 ml of water containing 48.1 g of bisphenol A and 17 g of sodium hydroxide.

Three hours later the mixture is poured into 2200 ml of methylene chloride; the organic phase is then separated and washed, in the order, with 450 ml of water (twice), 1300 ml of 0.15N aqueous sodium hydroxide (3 times), 900 ml of water (twice), 1300 ml of 0.1N hydrochloric acid and, finally, with 900-ml water portions, up to neutrality.

The branched polycarbonate, isolated by the usual methodology, shows the following characteristics:
intrinsic viscosity=0.556 dl/g;
shear sensitivity=20.4;
IZOD impact strength=826 J/m.

EXAMPLE 4

Example 3 is repeated with the same operating modalities and amounts of reactants, with the exception of the fact that added is 2.9 g of 1,3,6-naphthalene-trisulphonic acid trichloride (0.70% molar relatively to total bisphenol A) is added.

The branched polycarbonate obtained has the following characteristics:
intrinsic viscosity=0.619 dl/g;
shear sensitivity=28.7;
IZOD=impact strength=831 J/m.

We claim:

1. A branched polycarbonate produced from at least one aromatic dihydroxy compound, a carbonate precursor and a branching agent having the following formula:

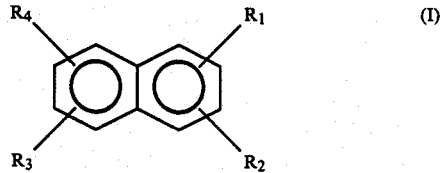

wherein $R_1$ is H and $R_2$–$R_4$ are —$SO_2Cl$.

2. The branched polycarbonate of claim 1, wherein the compound of formula (I) is present in an amount of from 0.05 to 5 mol % relative to the amount of the aromatic dihydroxy compound.

* * * * *